United States Patent [19]

Dave

[11] 3,762,381
[45] Oct. 2, 1973

[54] VARIABLE INTERNAL COMBUSTION ENGINE VALVE OPERATING SYSTEM

[76] Inventor: Sharad M. Dave, 14574 Braile, Detroit, Mich. 48223

[22] Filed: Oct. 30, 1972

[21] Appl. No.: 302,004

Related U.S. Application Data

[63] Continuation-in-part of Ser. No. 59,638, July 30, 1970, abandoned.

[52] U.S. Cl....... 123/90.15, 123/188 S, 123/188 M, 123/188 AF
[51] Int. Cl. ............................ F01l 1/34, F01l 3/22
[58] Field of Search ................ 123/188 S, 188 AF, 123/188 M, 90.15, 90.16, 90.17, 90.18, 97 B, 79 C

[56] References Cited
UNITED STATES PATENTS

| | | | |
|---|---|---|---|
| 2,804,061 | 8/1957 | Gamble | 123/90.18 |
| 2,969,051 | 1/1961 | Webster | 123/90.18 |
| 3,068,847 | 12/1962 | Wentworth | 123/188 M X |
| 3,481,314 | 12/1969 | LeCrenn | 123/90.18 |
| 3,507,261 | 4/1970 | Myers et al. | 123/188 M X |
| 3,557,762 | 1/1971 | Mitchell | 123/188 AF X |

FOREIGN PATENTS OR APPLICATIONS

| | | | |
|---|---|---|---|
| 578,468 | 6/1946 | Great Britain | 123/79 C |

*Primary Examiner*—Al Lawrence Smith
*Attorney*—Lloyd M. Forster

[57] ABSTRACT

System for automatic variation of valve operation including an apparatus and method utilizing the intake manifold vacuum of an internal combustion engine to control the position of auxiliary sleeve valves adjacent the conventional engine valves and thereby change the effective opening and closing of the engine valves. The result is an automatic adjustment of valve timing as a function of intake manifold vacuum, engine speed or accelerator pedal position to obtain maximum efficiency and low emissions throughout the operating range of the engine from idle through wide open throttle. An additional benefit that may be incorporated is improved engine breaking as well as lowered emissions under deceleration conditions.

13 Claims, 17 Drawing Figures

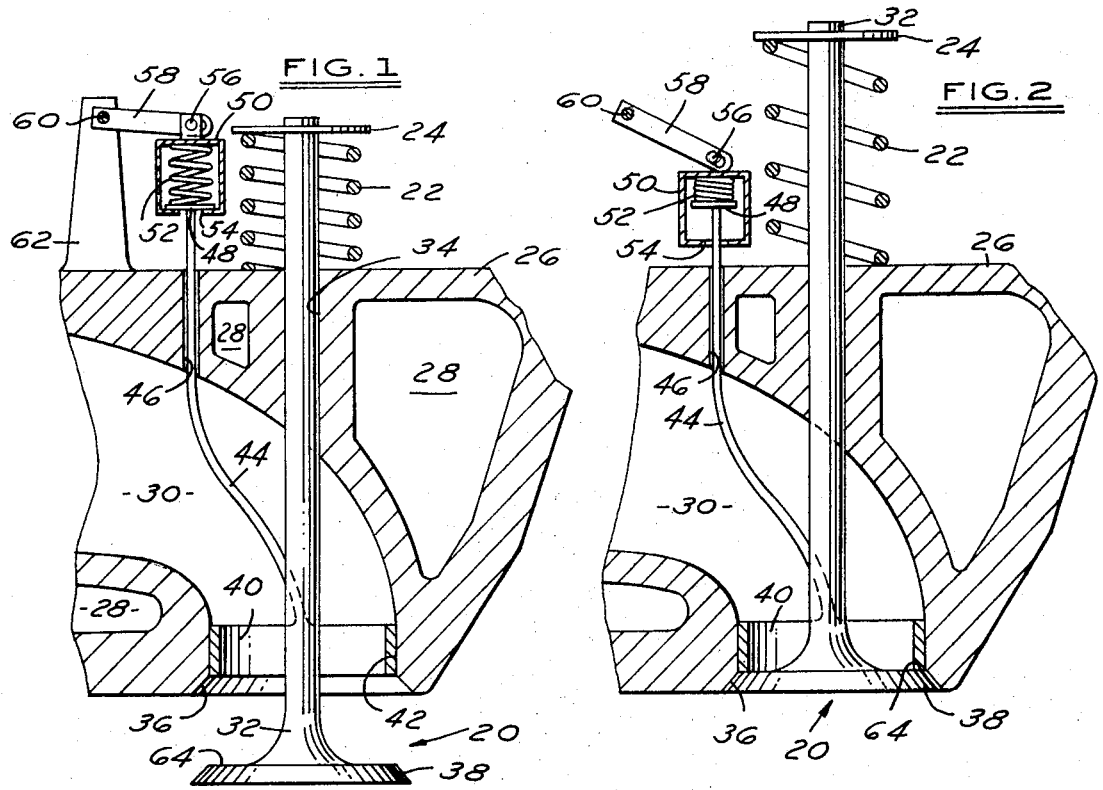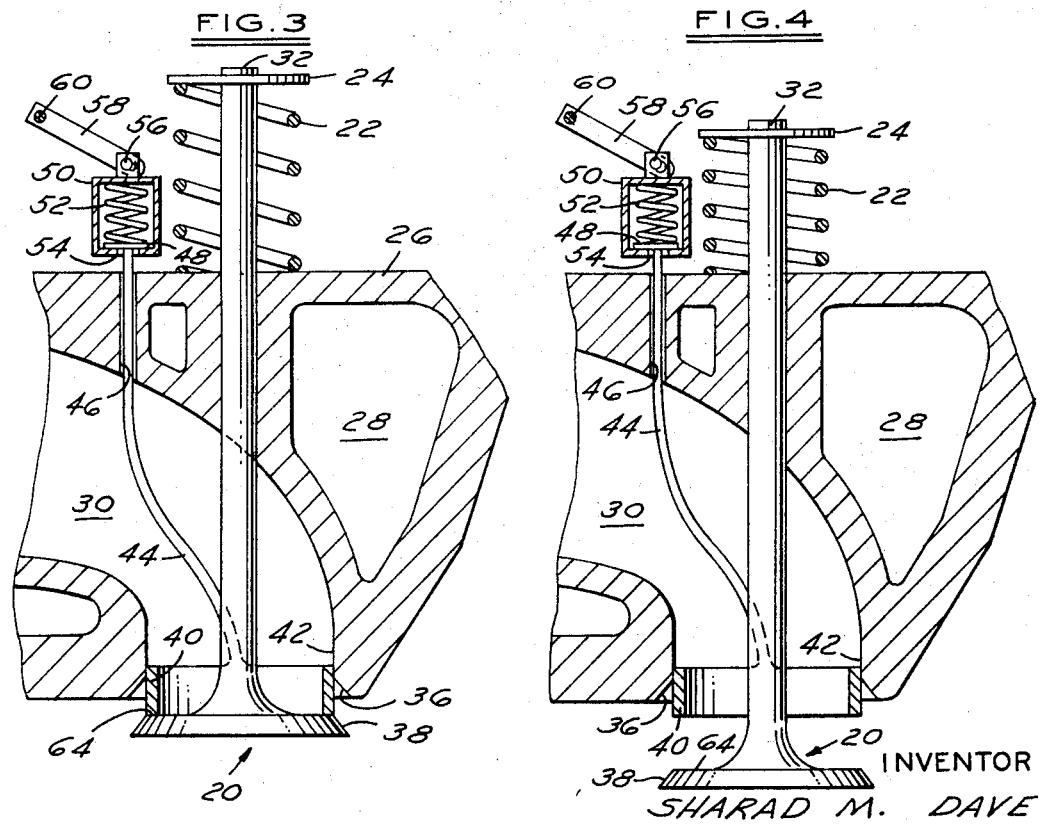

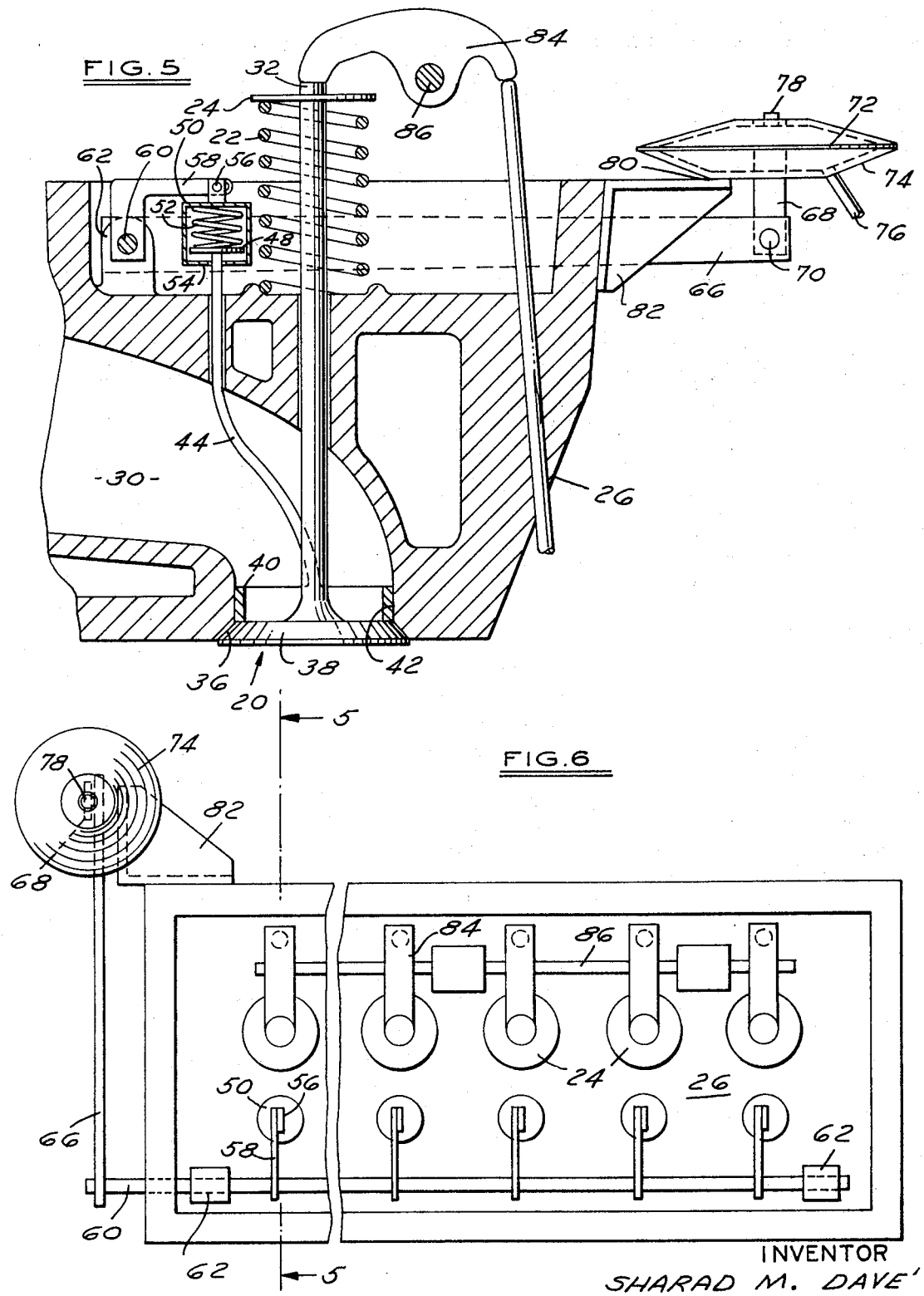

INVENTOR
SHARAD M. DAVE
BY
Farley Forster & Farley
ATTORNEYS

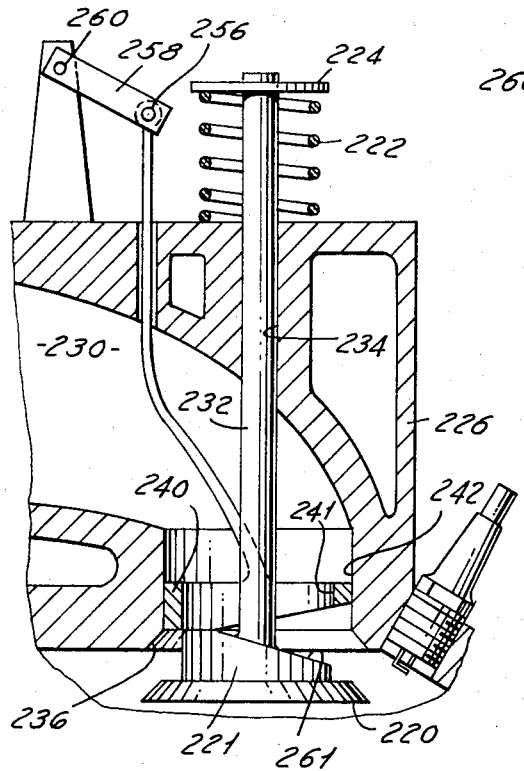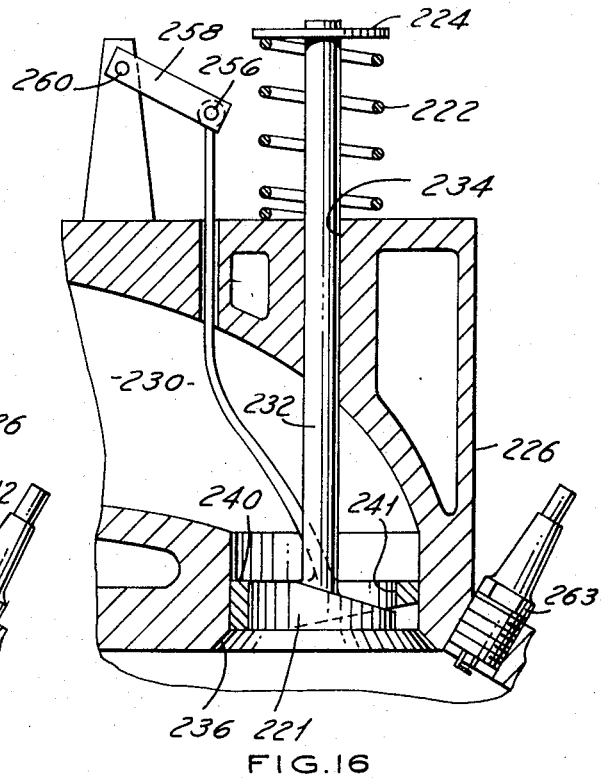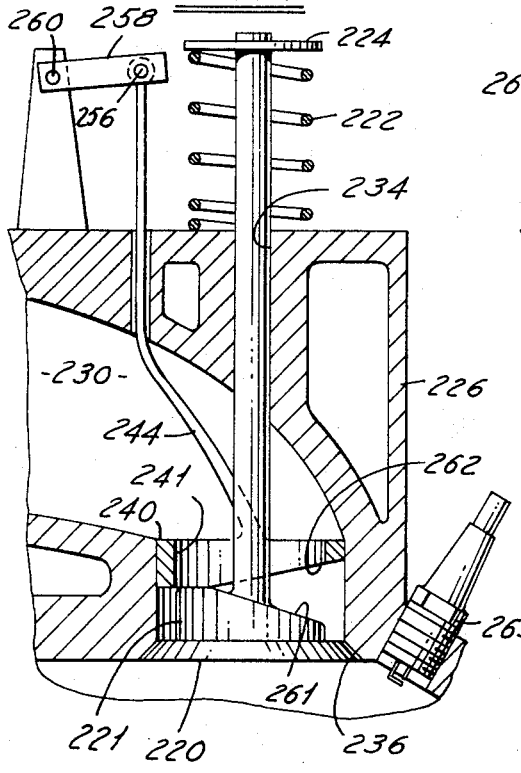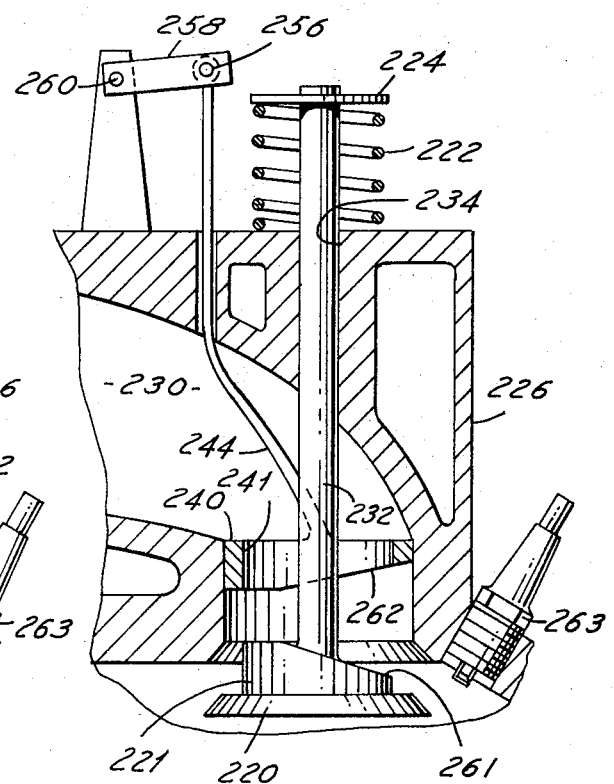

VARIABLE INTERNAL COMBUSTION ENGINE VALVE OPERATING SYSTEM

This application is a continuation-in-part of my co-pending application, Ser. No. 59,638 filed on July 30, 1970 to become abandoned upon the filing of the present application.

BACKGROUND OF THE INVENTION

Conventional four cycle internal combustion engines, both gasoline and diesel and many two cycle internal combustion engines utilize valves driven by a positive mechanical linkage. The typical automobile engine utilizes a cam shaft driven by a timing chain from the crank shaft and a push rod and rocker arm linkage from the cam shaft to the individual valves. Regardless of engine speed or throttle position, the timing for each valve is fixed mechanically with respect to the crank shaft angular position by the timing chain and each individual cam. The particular cam shaft utilized is determined by the purpose to which the engine is to be put. An engine that will be utilized primarily as a low speed prime mover will have a cam selected for maximum engine efficiency at low speed, whereas an engine to be used at high speeds, such as for racing, would utilize a cam for maximum horse power output at high speeds. Unfortunately, the timing for maximum efficiency at low speed is decidedly different from the timing for each valve at high speed. Where an engine is to be operated primarily at one speed or the other, the proper cam is selected and the difficulties to which the present invention is directed do not arise. However, in typical automotive use, the engine, either gasoline powered or diesel powered, must be capable of operating for significantly large percentages of time at both low speeds and high speeds and with high or low horsepower output throughout its speed range. The typical cam is a compromise to permit a sufficiently high horsepower output at high speed and nevertheless allow for reasonably smooth running conditions at idle and low speeds. A loss in operating efficiency however results and this loss is most obvious under deceleration, at low speeds and idle. One of the more obvious results is high pollution levels from the engine at idle and low speeds. The compromise cam design results in overlap of the inlet valve timing and the exhaust valve timing. At idle and low speeds there is improper scavenging of the exhaust from the cylinder and a relatively high pressure in the exhaust manifold with respect to the intake manifold pressure. As a result, in order to obtain a smooth running engine at low speeds and idle a relatively rich fuel mixture must be utilized to overcome dilution by retained exhaust gases. The result is increased hydrocarbon emissions, due to incomplete combustion and a relatively cool exhaust manifold which prevents further oxidation of the incompletely burned products in the exhaust. The same engine running at high speed and wide open throttle more completely scavenges the exhaust and the exhaust gases do not back up into the intake manifold since the pressure in the intake manifold is relatively near the pressure in the exhaust manifold. The exhaust manifold is relatively hot thereby helping to complete combustion of the unburned products in the exhaust manifold.

Under decelerating conditions, the engine is operating at relatively high speeds, however, the throttle is closed and the intake manifold pressure is very low. The result is a very rich mixture being introduced into the combustion chamber and again being incompletely oxidized due to the tendency for exhaust pumping back into the cylinder and the intake manifold. Relatively high pollution levels are produced in conventional engines under decelerating conditions.

In a stratified charge engine, the inlet port is usually located in tangential relation to the cylinder and a fixed shroud on one side of the intake valve directs the incoming air into a tangential swirl past the fuel inlet port of fuel injection engine. Complicated piston head designs are often used to form special shape of the combustion chamber and to enhance swirling action. For optimum results, a much greater rate of swirl is required at light loads than at maximum power where excessive swirl rate reduces the maximum power; whereas a low swirl rate at light load creates improper combustion in a stratified charge engine. Therefore, fixed valve shroud, angle of the inlet port and the shape of combustion chamber form a compromise design in prior stratified charge engines.

In order to provide optimum mixture motion for improved combustion at varying loads, variable intake valve directional bias is desirable to create variable swirl rate. The rate of swirl within combustion chamber has a great influence on the duration of combustion, rate of rise of pressure, thermal efficiency and exhaust emissions.

SUMMARY OF THE INVENTION

The invention utilizes the intake manifold vacuum to control auxiliary sleeve valves superimposed on and cooperating with the conventional engine valves, thus providing automatic closed loop control of the effective timing of the valves. In one embodiment, the sleeve valves are actuated when the intake manifold vacuum is relatively high such as during deceleration, low speed operation and idle, at which times the throttle is partly or completely closed. The actuating mechanism utilizes a spring with a limited travel to position the sleeve valve against the passage side of the valve. When the valve opens, the sleeve moves with the valve during the initial portion of the valve opening stroke but then stops prior to the maximum open position of the valve. When the valve closes, the sleeve valve is again contacted prior to complete closure of the valve. The result is a change in the effective timing of the valve, i.e., the valve opening is retarded and the closing is accelerated relative to the crank shaft angular position.

In a preferred alternate embodiment, the passage side of the valve is provided with an annular shoulder which will clear the inner periphery of the sleeve valve. In this embodiment, however, the sleeve valve when actuated is adjacent the shoulder when the valve is closed but need not contact the valve and does not move with the valve when the valve opens. Rather, when the engine is operating under open throttle conditions, the sleeve valve is moved further away from the valve. The actuating mechanism in this embodiment is simpler in that it eliminates the spring and also eliminates the acceleration and deceleration problems due to impact of the valve upon the sleeve as the valve closes. Use of less expensive materials and quieter sleeve valve operation will be additional results of the alternate embodiment.

As alternatives to utilization of intake manifold vacuum, the engine speed could be utilized for closed loop control with a speed sensor actuating the sleeve valves or accelerator pedal position could be utilized for open loop control of the sleeve valves. Maximum benefit will be more likely obtained with utilization of the intake manifold vacuum since proper sleeve valve position can easily be obtained for both high and low speed operation under part throttle and decelerating conditions. An automobile in typical use is operated under part throttle conditions the vast majority of time whether in the city or on the highways. Full open throttle occurs only for maximum acceleration and maximum speed. The invention automatically senses for the proper effective valve timing and adjusts the sleeve valves accordingly. The result is greater fuel economy and lower pollutant emissions under idle, low speed, cruising speed or decelerating conditions.

Depending upon the use to which the engine is put and the result to be desired, the invention may be applied to both the intake and the exhaust valves or either to the exclusion of the other. In addition, when applied to the exhaust valve under deceleration conditions of the vehicle the effective timing may be altered to minimize the duration that the exhaust valve is open and thus provide improved engine braking. This latter option is most useful in the case of engines used for trucks, thereby eliminating or reducing the need for optional equipment such as hydraulic retarders or additional engine braking valves located in the exhaust manifold.

DESCRIPTION OF THE DRAWINGS

FIG. 1 is a fragmentary section of an engine cylinder head in the region about an engine valve shown open and operating under open throttle conditions;

FIG. 2 is the same section with the valve closed and the engine operating under part or closed throttle conditions.

FIG. 3 is the same section with the engine under part or closed throttle conditions and the valve beginning to open;

FIG. 4 is the same section with the engine operating under part or closed throttle conditions and the valve fully open;

FIG. 5 shows the same section with the actuating mechanism shown schematically;

FIG. 6 is the top view of an engine schematically showing the actuating mechanism;

FIG. 14 is a fragmentary section for another alternate embodiment of the region about an engine valve with the engine under part or closed throttle condition and valve shown open;

FIG. 15 shows the valve of FIG. 14 with valve closed and the engine operating under part or closed throttle condition;

FIG. 16 shows the valve of FIG. 14 with valve open and the engine operating under open throttle condition; and, FIG. 17 shows the valve of FIG. 14 with valve closed and the engine operating under open throttle condition.

DESCRIPTION OF THE PREFERRED EMBODIMENTS

Figure 7:
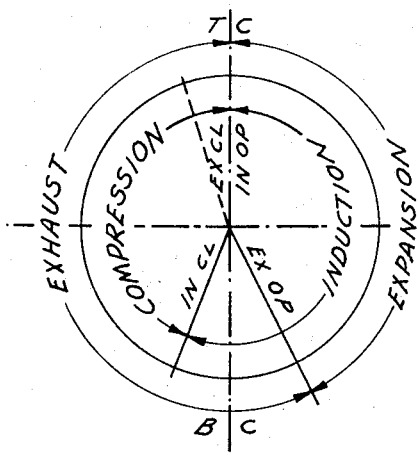
FIG. 7 is a valve timing diagram for a typical low speed engine.

In FIG. 1 a typical internal combustion engine valve 20 is shown fully open with the valve spring 22 compressed and held by a valve spring retainer 24. The valve is located in a portion of the engine 26, usually the cylinder head, having cooling water passages 28 and a passage 30 which may be either the intake passage leading from the intake manifold or the exhaust passage leading to the exhaust manifold. The valve 20 has a stem 32 passing through a guide passage 34 in the head 26. A valve seat 36 is machined into the head 26 to mate with the seating portion 38 of the valve in conventional fashion. Inside the passage 30 a sleeve 40 is located adjacent the valve seat 36 and slideable on the inside surface 42 of the passage 30 adjacent the valve seat 36. The sleeve 40 is attached to a connecting member 44 which passes through a guide passage 46 in the head 26 of the engine. The connecting member 44 has a small plate 48 attached and located within a chamber 50 containing a compression spring 52. The compression spring 52 is retained between the plate 48 and the opposite end of the chamber 50. The end of the chamber 54 is a stop to prevent the spring 52 from moving the plate 48 and member 44 and thus displacing the sleeve 40 from the position shown. The chamber 50 is pinned at 56 to an arm 58 which in turn may be rotated by the shaft 60. The shaft 60 is mounted on supports 62 attached to the head of the engine 26.

In FIG. 2 the valve is shown closed with the seating portion 38 in contact with the valve seat 36. However, upon a signal caused by higher intake manifold vacuum the actuating means for the invention has turned the shaft 60 and moved the arm 58 to move the chamber 50 downward. The spring 52 has been compressed against the plate 48 since the sleeve 40 has not moved from its position in FIG. 1. The sleeve 40, however, is now in contact with the passage side of the valve head 64. Thus, when the valve 20 begins to open, as shown in FIG. 3, the spring 52 pushing against the plate 48 will force the sleeve 40 to follow the valve head. The sleeve 40 will move inside the passage 30 as the valve opens. The chamber 50 will not move as the valve opens, however, the spring 52 will expand until the plate 48 strikes the end 54 of the chamber 50. The end 54 thus constitutes a stop for the plate 48 and retains the connecting member 44 and sleeve 40 as shown in FIG. 4. As described below, the intake manifold vacuum will determine the position of the chamber 50 and thereby determine the position of the sleeve 40 at maximum extension as shown in FIG. 4. It may be noted here, that the motions are greatly exaggerated and in an actual engine, the movement of the valve 20 is on the order of 0.4 of an inch and the movement of the sleeve 40 is on the order of 0.020 to 0.030 of an inch. Of course valve opening and sleeve opening will depend on the overall size of the engine and the maximum change in effective timing desired. In FIG. 4 the valve is shown fully open. The sleeve 40 is also shown fully actuated in which position it remains until the valve 20 closes. As the valve 20 closes, it strikes the sleeve 40 and pushes it back up into the passage 30 until the position, shown in FIG. 2, is again obtained. Thus, while the valve 20, actuated by the cam shaft of the engine in a conventional manner, continues to operate with the same timing regardless of intake manifold vacuum throttle position, or engine speed, the sleeve 40, actuated by the intake manifold vacuum which in turn is controlled by the throttle, adjusts the effective timing of the valve by retarding the opening for gas flow and accelerating the closing for gas flow of the valve.

Figure 8:
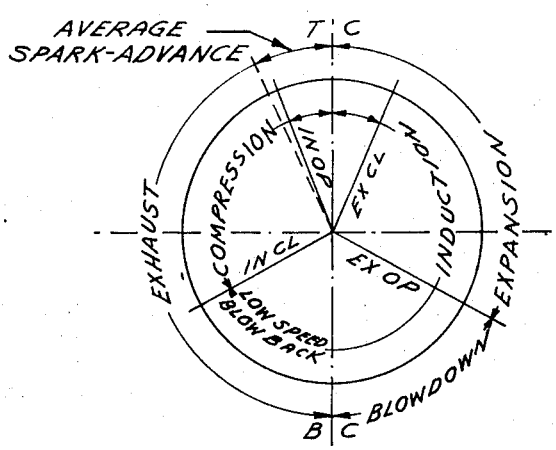
FIG. 8 is the valve timing diagram for a typical automobile engine.

The effect of the sleeve 40 may be more clearly shown by considering the valve timing diagrams of FIGS. 7 and 8. If we assume that the cam shaft configuration results in valve timing as shown in FIG. 8 which is typical for automobile engines and most effective at relatively high engine speeds, then the operation of the engine with the throttle open results in the diagram shown in FIG. 8. Without the sleeve and actuating mechanism of the present invention, the valve timing will remain as in FIG. 8 regardless of engine speed or throttle position. However, with the sleeve 40 in both the exhaust and intake valve passages and with part or closed throttle operating conditions, the effective valve timing because of the action of the sleeve 40 will more nearly conform to that shown in FIG. 7. The overlap in the upper portion of the diagram of FIG. 8 between the opening of the intake valve and the closing of the exhaust valve, can be eliminated which will eliminate exhaust pumping under part or closed throttle conditions. The most efficient valve timing for a low speed engine as shown in FIG. 7 is thereby obtained with the present invention.

The actuating mechanism, which senses the vacuum in the intake manifold and actuates the sleeve 40, is shown in FIGS. 5 and 6. In FIG. 5, the head of the engine 26 incorporating the valve 20 is shown. The sleeve 40, connecting member 44, chamber 50, spring 52, end 54 and plate 48 are as in FIGS. 1–4. The actuating arm 58 is shown again connected to the shaft 60. The shaft 60 rotates in the supports 62 shown in FIG. 6. Another connecting arm 66 is fastened to shaft 60 and pinned to connecting link 68 at 70. The connecting member 68 is attached to a diaphragm 72 inside a diaphragm chamber 74 wherein one side of the chamber 74 communicates with the intake manifold of the engine by means of the pipe 76. The other side of the diaphragm chamber 74 is open to the atmosphere at 78. The sleeve 40 is actuated by the pressure differential between the static pressure in the intake manifold and atmospheric pressure, i.e., the intake manifold vacuum. Alternatively by the pressure differential between the intake and exhaust manifolds might be utilized. The chamber 74 is attached at 80 to a bracket 82 which in turn is attached to the engine head 26. FIG. 6 schematically shows the layout of the actuating mechanism above the head of the engine in relation to the valves. Shown are the conventional rocker arms 84 which rotate about the rocker arm shaft 86.

Figure 9:
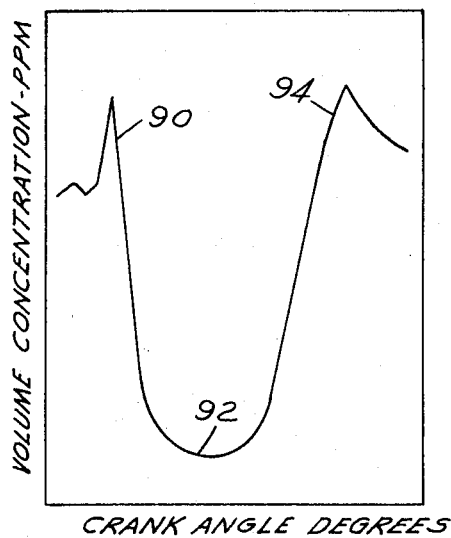
FIG. 9 is a graph of a typical curve denoting exhaust hydrocarbon concentration versus crank shaft angle for the portion of crankshaft rotation including the opening and closing of the exhaust valve.

FIG. 9 is a typical curve for volume concentration of unburned hydrocarbons exhausted versus crank angle degrees during the portion of the combustion cycle when the exhaust valve is open. The first peak 90, when the exhaust valve first opens, is the result of the high hydrocarbon content in the quench gases immediately adjacent the valve inside the cylinder. The relatively low central portion 92 of the curve constitutes the hydrocarbons present in the body of the gas exhausted. The final peak 94, before the exhaust valve closes, constitutes the high hydrocarbon content of the quench gases scraped from the cylinder walls by the piston. The greater portion of the unburned or partially burned hydrocarbons exhausted result from the quench gases exhausted at the beginning and the end of the open exhaust valve phase. Under open throttle conditions when the efficiency of combustion in the engine is relatively high and the exhaust manifold temperature is relatively high, the combustion of the unburned hydrocarbon output is further completed in the exhaust manifold. However, under part or closed throttle conditions, the fuel air mixture is relatively rich resulting in a higher hydrocarbon content for both the peaks and the valley and significantly greater unburned hydrocarbon content in the exhaust gases. With respect to the operation of the exhaust valve, the present invention under part or closed throttle conditions retards the opening of the exhaust valve thus retaining the quench gases surrounding the exhaust valve for a longer time in the cylinder. This results in further combustion inside the cylinder of the quench gases near the exhaust valve, thus reducing the first peak on the curve. Also fuel economy is improved since combustion and expansion of the exhaust gases is extended in time in the cylinder. The exhaust gases are expelled at a slightly higher temperature since combustion is prolonged in the cylinder and the exhaust manifold will be operating at a higher temperature than otherwise under part or closed throttle conditions. Improved final combustion in the exhaust manifold results. The most important aspect, however, is the accelerated closing of the exhaust valve which effectively cuts off the second peak of the curve by retaining the quench gases scraped from the cylinder walls within the cylinder through the next cycle. During the next cycle, the quench gases are mixed with the incoming fuel air mixture and further burn before they can be expelled into the exhaust manifold. In addition the quench gases retained lower the combustion temperature at the flame front and thereby lower the output of nitrogen oxide pollutants. The overall effect is to create an engine that runs more efficiently under part or closed throttle conditions and low speeds by obtaining the valve timing most conducive to efficient operation at low speeds and which would be used for a low speed engine. Where the invention is applied to both the exhaust valves and intake valves, the operation under part or closed throttle conditions prevents the pumping of the remaining exhaust gases into the intake manifold, thereby disturbing the air fuel mixture entering the cylinder. Improved idling and part throttle conditions can be obtained with a leaner fuel air mixture than normally would be required for part or closed throttle conditions and this further contributes to both lower hydrocarbon emissions and lower carbon monoxide emissions. The total effect is to lower hydrocarbon, carbon monoxide, and nitrogen oxide emissions by solely mechanical means without auxiliary equipment such as catalytic burners.

Figure 10:
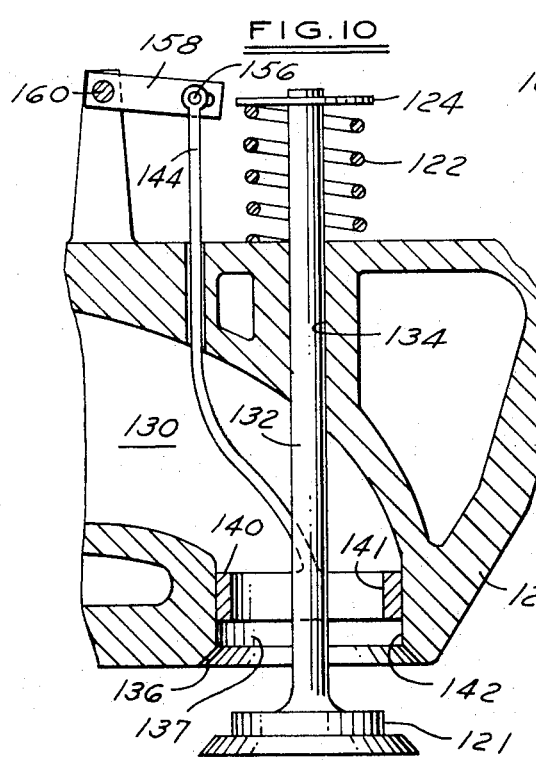
FIG. 10 is a fragmentary section for an alternate embodiment of the region about an engine valve with the engine under open throttle conditions and the valve shown open.
Figure 11:
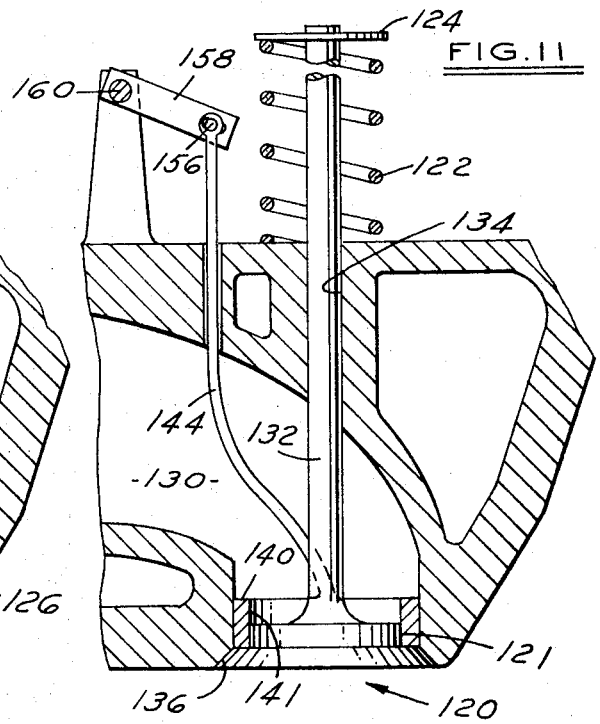
FIG. 11 shows the valve of FIG. 10 with the valve closed and the engine operating under part or closed throttle conditions.
Figure 12:
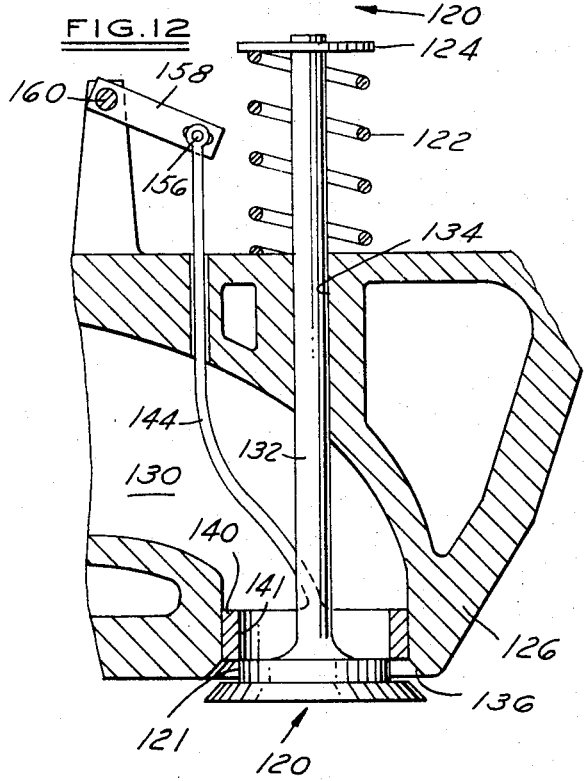
FIG. 12 shows the valve of FIG. 10 beginning to open with the engine operating under part or closed throttle conditions.
Figure 13:
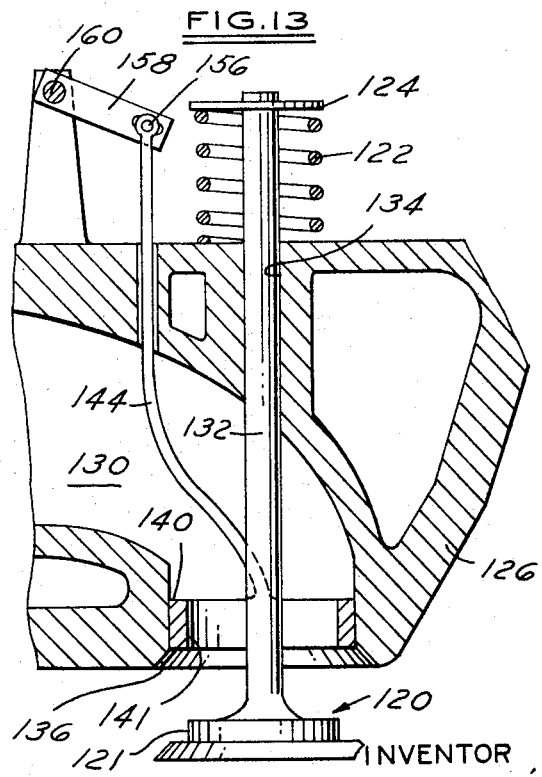
FIG. 13 shows the valve of FIG. 10 fully open with the engine operating under part or closed throttle conditions.

In FIG. 10 an alternate embodiment of the invention is shown. As in FIG. 1, the valve 120 is fully open and the engine is operating under open throttle conditions. The sleeve 140 is slideable in the passage 130 adjacent the surface 142 and the valve seat 136. Here, however, the sleeve 140 is slightly further from the valve seat 136; a distance denoted by 137. The valve operating mechanism is the same as before and as in a conventional engine with a valve spring 122, retaining disc 124 and valve stem 132 slideable in a guide passage 134 through the engine head 126. However, in this embodiment the spring means of the first embodiment is not necessary. Therefore, the connecting member 144 is pinned at 156 directly to the arm 158 which in turn is connected to the shaft 160 corresponding to the shaft 60 shown in FIG. 1. The sleeve is thus actuated in a similar manner to the first embodiment as shown in FIG. 5. The spring means of the first embodiment is not necessary because as shown in FIGS. 11-13 the sleeve 140 does not move with the valve 120 but rather is positioned closer to the valve seat 136 than as shown in FIG. 10. The valve 120 is provided with a shoulder 121 which clears the inner periphery 141 of the sleeve 140. FIG. 11 shows the sleeve 140 in actuated position for an engine operating under part or closed throttle conditions with the valve 120 closed. The sleeve need not contact the valve and it is preferable that it not contact the valve, thereby preventing any wear on the sleeve or valve due to impact when the valve closes. As shown in FIG. 12, the valve is beginning to open, however, the sleeve has retarded the effective opening of the valve. Obviously, when the valve closes the effective closing will be accelerated and a change in effective valve timing will be the result as in the first embodiment. FIG. 13 shows the valve 120 fully open with the sleeve 140 in actuated position. In this alternate embodiment, it is to be noted that the sleeve is not subject to the impact loading as in the first embodiment wherein the passage side of the valve strikes the sleeve as the valve closes.

FIGS. 14-17 show yet another embodiment of the invention in which all the elements except the inclined face 262 of sleeve 240 and surface 261 of the valve shoulder 221, and the addition of a spark plug 263 are identical to the elements shown in FIG. 10. The face 262 of the sleeve 240 and the surface 261 of the valve shoulder 221 are oppositely inclined as shown in FIGS. 14-17 to provide a directional flow which may be toward a fuel inlet in the case of a fuel injection engine or toward a spark plug 263 as shown in the case of a carburetor engine.

In FIG. 14, the valve 220 is fully open with the engine operating under part or closed throttle condition and the sleeve 240 fully extended for maximum throttling action. It will be seen that used as an intake valve, it is specially suited for creating directional swirl within the combustion chamber and biasing the flow toward the spark plug 263. FIG. 15 shows the sleeve 240 in actuated position for an engine operating under part or closed throttle condition with valve 220 closed.

FIG. 16 shows valve 220 fully open, with the sleeve 240 in retracted position as when the engine is under open throttle condition.

It will be noted that in this case flow can take place around the entire periphery of the valve as soon as it starts to open thereby reducing the directional swirl as required to achieve maximum power.

FIG. 17 shows the sleeve in retracted position with valve closed.

It will be understood that a partial directional flow effect can be achieved by providing an inclined surface on only one of the valve or sleeve elements and that when omitted on the valve element, a rotatable valve mounting may be used.

The connecting members 44 and 144 may be attached to the sleeves, as shown, or in any other manner that will minimize the disturbance to gas flow in the passage and be adequately simple and sturdy to last for the life of the engine. In the second embodiment, the sleeve need not be made of the high quality materials necessary for the valve or the sleeve that moves with the valve and is subject to impact. The sleeve only changes position when the intake manifold vacuum changes or other alternate sensing device signals a change, and thus will not move when the engine is operating under constant conditions. The height of the shoulder on the valve will determine the opening and closing time for a given range of positions and is a further parameter that may be designed into the engine.

I claim:

1. In an internal combustion engine having a piston and a cylinder and a head delimiting a combustion chamber, inlet and exhaust passages communicating with said combustion chamber, valve seats at the juncture of said passages with said combustion chamber, a single inlet and single exhaust constant stroke valve seatable on said valve seats, the improvement characterized by auxilliary variable sleeve valve means for varying the effective timing and duration of valve opening in a constant valve stroke for at least one of said valves, said sleeve valve means being engageable by said valve and actuationg means for varying the position of said sleeve valve means responsive to change of engine operating conditions, said sleeve valve means being moved by said actuation means to a predetermined position maintained during disengagement of said valve from said sleeve valve means thereby varying the effective timing and duration of valve opening in response to said operating conditions.

2. The improved engine of claim 1 wherein said actuation means position said sleeve valve means against valve so as to move said sleeve valve means with said valve during the initial portion of the opening and final portion of the closing of said valve thereby varying the timing and duration of the effective opening and the effective closing of said valve.

3. The improved engine of claim 2 wherein said actuation means include intake manifold vacuum responsive means.

4. The improved engine of claim 3 wherein said actuation means includes spring means, a member connecting said spring means to said sleeve valve means and means connecting said spring means to said fluid vacuum responsive means.

5. The improved engine of claim 4 including stop means adjacent said spring means to limit the movement of said spring means thereby limiting the movement of said sleeve valve means into said combustion chamber.

6. In an internal combustion engine having a piston and a cylinder and a head delimiting a combustion chamber, inlet and exhaust passages communicating with said combustion chamber, valve seats at the juncture of said passages with said combustion chamber and inlet and exhaust valves seatable on said valve seats, the improvement characterized by a sleeve valve mounted on said valve seats, the improvement characterized by a sleeve valve mounted in at least one of said passages, an annular shoulder on the passage side of said valve, said shoulder having a minimum diameter sufficient to clear the inner periphery of said sleeve valve, actuatable means to vary the position of said sleeve valve relative to said valve seat thereby varying the timing and duration of the effective opening and the effective closing of said valve.

7. The improved engine of claim 6 wherein said actuatable means include intake manifold vacuum responsive means.

8. An improved internal combustion engine having a piston and a cylinder and a head delimiting a combustion chamber, an inlet passage communicating with said combustion chamber, a valve seat at the juncture of said passage with said combustion chamber and an inlet valve seatable on said valve seat, characterized by a sleeve valve mounted in said inlet passage, an annular shoulder on the passage side of said inlet valve, said shoulder having a minimum diameter sufficient to clear the inner periphery of said sleeve valve, actuatable means to vary the position of said sleeve valve relative to said valve seat thereby varying the effective opening and the effective closing of said inlet valve, at least one of said inlet valve and sleeve valve elements being formed to provide a directional passage progressively opened during at least the initial inlet valve opening concentrating the initial inlet valve flow past a limited portion of said annular shoulder toward a particular portion of the cylinder.

9. The improved engine of claim 8 wherein both of said inlet valve and sleeve valve elements are formed to cooperate in providing said directional passage.

10. The improved engine of claim 8 wherein said directional passage is formed by at least one valve element surface inclined to its axis.

11. The improved engine of claim 9 wherein said directional passage is formed by oppositely inclined surfaces relative to the axis of said respective inlet and sleeve valve elements.

12. The improved engine of claim 8 including annular passage means opening around a variable portion of the inner periphery of said sleeve valve when said engine is operating under variable positions of said sleeve valve thereby forming a flow passage with variable directional bias and variable effective flow restriction.

13. The improved engine of claim 12 wherein said annular passage means is opened by the initial opening movement of said inlet valve when said sleeve valve is in its fully retracted position corresponding to high power operation thereby reducing the relative directional flow effect of said directional passage as compared to low power operation corresponding to an extended position of said sleeve valve.

* * * * *